METHOD OF MANUFACTURING A TEMPERATURE SENSITIVE, ELECTRICAL RESISTOR MATERIAL
Filed Jan. 25, 1968

INVENTORS
JUNSHI KAWASHIMA
HIROYUKI KITAMURA
BY
Ward, Haselton, Mc Elhannon, Brooks + Fitzpatrick
ATTORNEYS United States Patent Office 3,591,526

Patented July 6, 1971

3,591,526

METHOD OF MANUFACTURING A TEMPERATURE SENSITIVE, ELECTRICAL RESISTOR MATERIAL

Junshi Kawashima, Osaka, and Hiroyuki Kitamura, Osaka-shi, Japan, assignors to Polyelectric Corporation, Larchmont, N.Y.

Filed Jan. 25, 1968, Ser. No. 704,979
Int. Cl. C08f *1/84;* H01b *1/06*
U.S. Cl. 252—511 9 Claims

ABSTRACT OF THE DISCLOSURE

A method of producing a temperature sensitive, organic electrical resistor material in which a thermoplastic, such as polyethylene, and a conductive material, such as carbon black, are mixed in predetermined proportions and then such mixture is mixed with a thermosetting or thermoplastic molding material and molded to provide a substance exhibiting a relatively low electrical resistance below a temperature range of about 100°–130° C. and a relatively high resistance above said temperature range.

Figure 1:
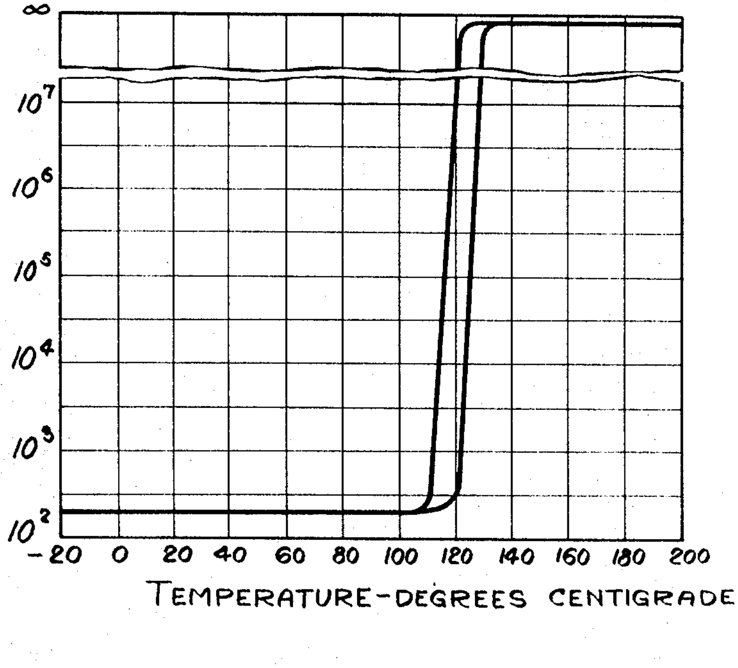

The present invention relates to a method of producing a temperature sensitive, electrical resistor material and, more particularly, to a process of making a conductive organic substance exhibiting unusual electrical characteristics in response to temperature changes.

Various organic materials have been utilized heretofore for the manufacture of resistors, thermoelectric elements and the like. In general, these devices have employed combinations of some organic substance, such as a plastic or rubber, in conjunction with carbon black and have relied upon the combined properties of both the organic substance and the carbon black in order to achieve the desired results. One form of such a device is disclosed in U.S. Pat. No. 3,243,753.

The plastic or rubber substances, alone, normally exhibit good electrical insulating properties, but when a conductive material such as carbon black is combined therewith, the resultant material may be used to produce devices having predetermined electrical conductive qualities as well as sufficient mechanical strength. Although such devices are conductive, they do have an electrical resistance which is substantially higher than that of a metallic conductor, such as a conductor of copper or aluminum, and when an electrical current is passed therethrough, heating results which provides a unique temperature-resistance characteristic whereby the resistance is relatively constant below a predetermined temperature and rises rapidly above such temperature. However, the devices generate heat easily even with low currents, and the resistance is still finite at temperatures above said temperature. If currents larger than those for which the devices are designed are passed therethrough, the material of the devices may reach high temperatures and may burn, soften, char or distort, destroying the desired properties of the devices.

In accordance with the present invention, it is possible to improve the characteristics of an electrical resistor of the type mentioned above and to make an electrical resistor which is much more resistant to damage, either physical or by reason of the passage of overload currents therethrough.

The electrical resistor material of the invention has a relatively low electrical resistance in the temperature range below 100° to 130° C. and has a relatively high resistance at temperatures above this range. Thus, at temperatures below 100° to 130° C., the resistance material acts similarly to conventional materials comprising plastics or rubbers mixed with carbon black, at which temperatures the materials are stable and last for a relatively long time, and may have a specific resistance in the range from tens to hundreds of ohms per centimeter. However, with the resistance material of the invention, once the temperature exceeds 100° to 130° C., the electrical resistance rapidly becomes very large, approaching infinity, so that there is no, or substantially no, current flow to cause overheating of the material. In other words, throughout the range of currents and temperatures which the electrical resistance material is able to withstand, there is no overheating of the material, and when the current tends to exceed the proper operating current, the resistance of the material becomes very large, preventing overheating of the resistance material. In this sense, the material is self-regulating and preventing the passage of damaging currents therethrough.

Because of the self-regulating characteristics of the material, it not only provides a greater temperature sensitivity in known applications but also provides a material having a wider range of applications than other temperature sensitive, electrical resistor materials heretofore known.

The material of the invention is produced by mixing a thermoplastic material with a finely divided conductive material and thereafter reducing the mixture to finely divided form. The latter finely divided mixture is then mixed with a molding compound, such as a thermoplastic, synthetic or natural rubber, or a thermosetting resin, and this second mixture is molded under the conditions necessary to mold the molding compound. The thermoplastic material and the conductive material of the first mixture may be any of the materials set forth in said Pat. No. 3,243,753 and, for example, may be respectively a polyolefin, such as polyethylene, polypropylene, polyisobutylene, halo-derivatives of polyethylene, such as polytetrafluoroethylene, trifluoromonochloroethylene, copolymers or admixtures thereof, and carbon black, graphite, finely divided metals, alloys, non-metallic conductors, metal salts, etc. In the preferred embodiment of the invention, polyethylene is thoroughly mixed with carbon black, the mixture is reduced to a powder or small pellets, and the powder or pellets are then mixed with a thermosetting molding material such as phenol resin, urea resin, melamine resin, unsaturated polyester resin, epoxy resin, etc., and the resulting mixture is molded under heat and pressure sufficient to mold and set the thermosetting resin. Alternatively, the finely divided polyethylene-carbon mixture may be mixed with synthetic resins such as polyethylene, polypropylene, polyvinylidene chloride, polystyrene, polymethylmethacrylate, polycarbonate, polyacetal, ABS (acrylonitrile-butadiene-styrene) resin, AS (acrylonitrile-styrene) resin, or with natural or synthetic rubbers such as SBR (butadiene-styrene), butyl rubber, ethylene-propylene rubber, etc. or mixtures thereof, the second mixture being thereafter treated under conditions selected so as to produce a consolidated and solid product.

As used herein and in the claims, the term "consolidating" as used in reference to the second mixture comprising the first mixture and the molding material, means to subject the second mixture to heating and such other conditions as may be required, such as pressure, dependent upon the molding material used, to cause the second mixture to flow and produce a self-sustaining, solid article. Thus, in the case of the use of a thermosetting resin for the molding material, heat and molding pressure sufficient to cause the resin to flow and set would be used to consolidate the second mixture. In the case where a thermoplastic resin is used for the molding material, mere heating of the second mixture in a mold to a temperature sufficient to cause the second mixture to flow and the particles thereof to unite and subsequent cooling may be sufficient or heating to fluidizing temperature accompanied by pressure in a press, extruder, etc. may be used.

The characteristics of the material produced in accordance with the invention are surprising because the electrical and mechanical characteristics thereof differ substantially from the characteristics of a material produced by merely mixing a conductive material with a plastic material and then molding the resulting mixture. It appears that the first mixture provides a conductive material having a non-linear, temperature sensitive, electrical resistance characteristic and that the second mixture forms a protective matrix for the first mixture which not only preserves the conductive characteristics of the first mixture but also enhances the temperature sensitivity thereof and improves its mechanical and heat resisting properties.

Figure 2:
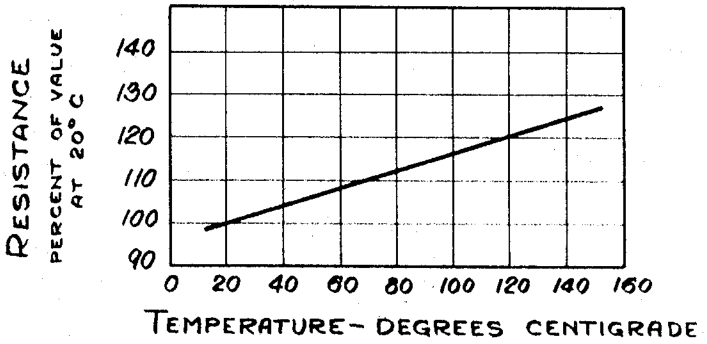

Various objects and advantages of the invention will be apparent from the following detailed description of preferred embodiments and methods of the invention. Reference will also be made to the drawing in which:

FIG. 1 is a graph illustrating the relationship between temperature and electrical resistance of material produced in accordance with Example I set forth hereinafter; and FIG. 2 is a graph illustrating the relationship between temperature and electrical resistance of a material produced by merely molding a mixture of carbon black and a phenolic resin.

In the first step of the preferred process, carbon black is mixed with polyethylene. The carbon black utilized in this step may be of any known type, including furnace black, acetylene black and channel black. In addition, the polyethylene may be of the low, medium or high pressure type presently available on the commercial market.

The actual mixing may be carried out by various means, but to obtain good dispersion of the carbon black into the polyethylene, means such as a heated two-roll mill or a Banbury mixer should be employed and provide excellent results.

The actual proportions of carbon black to polyethylene may vary depending on the desired resistance of the final product, and proportions in the range of 2:8 to 6:4 by weight of carbon black to polyethylene give satisfactory results. The preferred range is from 1:2 to 1:1. Generally, the more carbon black which is used in the mixture, the lower the resistance of the final product will be at temperatures below 100°–130° C. as carbon black is the conductive element in the mixture.

After mixing, the carbon black-polyethylene mixture is then reduced to a powder or small pellets, preferably the former, by any suitable known means. It is preferable, at this point, to obtain as fine a powder as possible. The finer mixture has certain advantages in the the later steps of the process require less of the carbon black-polyethylene mixture to produce a resistance of a given value when it is in an extremely fine powder than when a less fine powder is produced. In addition, the finer powder produces a final product having better quality and homogeneity.

The carbon black-polyethylene mixture is mixed with a molding material which may be of a great variety of material suitable for subsequent molding steps and includes both thermoplastic and thermosetting materials. Among the molding materials found to be satisfactory are those listed above.

The actual mixing of the carbon black-polyethylene mixture with the molding material may be performed in a conventional agitator mixer, a two-roll mill, a ball mill or other suitable mixing means. If a thermosetting resin is used at this step, care must be taken to carry out the mixing at a temperature below that which will cause the resin to set.

The actual ratio of carbon black-polyethylene mixture to the molding material is determined by the desired resistance of the final product taken at room temperature as well as the properties of heat resistance and mechanical strength desired and of the molding material used. The higher the proportion of carbon black-polyethylene in the mixture, the closer the final product simulates that mixture, and the room temperature resistance becomes relatively low. On the other hand, where the proportion of carbon black-polyethylene is low, the product more closely simulates the particular resin or rubber used, and the corresponding resistance at room temperature is relatively high. However, the heat durability and mechanical strength characteristics are enhanced. It has been found that the desired phenomenon of temperature-resistance change appears consistently where the carbon black-polyethylene portion of the mixture, on a weight basis, is of an amount greater than about 10 percent, and the mixture used for molding must comprise between 10–95 percent by weight of the carbon-polyethylene mixture and 90–5 percent by weight of the molding material. Preferably, the molding mixture comprises between 20–50 percent of the carbon-polyethylene mixture with the balance consisting essentially of the molding material.

The final mixture of carbon black-polyethylene and a resin or rubber may then be molded into any desired shape by conventional molding means, such as a press, an injection molding machine, a screw type extruder or a roll mill. The molding temperature should be higher than the melting point of the polyethylene and higher than the thermosetting temperature of the thermosetting resin, when used, or alternatively, if a thermoplastic is used as the molding material, higher than the fluidizing temperature of such thermoplastic.

As mentioned above, small pellets of the carbon black-polyethylene mixture can be used instead of the powdered mixture and may be used in the same manner as the powdered mixture. In both cases the mixture is in relatively finely divided form. Thus, after the carbon black-polyethylene mixture is prepared and pelleted, the pellets are mixed with the molding material, preferably a thermoplastic resin or rubber, in conventional apparatus such as a roll mill, an extruder or a Banbury mixer. This second mixture is then molded to the desired shape, such as sheet, rod or pipe, in a conventional molding machine, such as an extruder, or it may be injection or compression molded into the form of a pellet.

With the proces of the invention, it is possible to produce a molded electrical resistor material having a temperature response which is more sensitive and improved with respect to known types of temperature sensitive electrical resistor materials, and yet the material has characteristics similar to those of the molding material, such as chemical resistance, weather durability, mechanical strength, lightness, flexibility, ease of molding, etc.

The material produced in accordance with the invention has a relatively constant, low value of resistance at tempertaures below 100–130° C. and a high value of resistance, approaching infinity, at temperatures above such range. The temperature range at which the resistance changes from a low value to a high value varies in accordance with the melting point of the polyethylene used in the first or carbon-polyethylene, mixture low melting point polyethylene producing the sudden resistance increase at about 100° C. and high melting point polyethylene producing the sudden increase at about 130° C. Accordingly, it is possible to determine the temperature at which the resistance value suddenly increases by suitably selecting the melting point of the polyethylene employed.

FIG. 1 is graph showing the variation of electrical resistance of a molded material prepared in accordance with Example I hereinafter, and hence, comprising a molded mixture of carbon-polyethylene mixed with a phenolic molding compound. FIG. 2 is a graph showing the variation of electrical resistance with temperature of a molded mixture comprising only carbon black mixed with the same phenolic molding compound. As illustrated in FIG. 1, the molded material of the invention has a relatively low, substantially constant resistance at temperatures up to about 120° C., but at temperatures slightly above 120° C. the resistance rises rapidly and reaches a value approaching infinity at approximately 130° C. Due to the fact that there is a small hysteresis effect, the resistance decreases upon cooling from 130° C. or higher along a curve displaced slightly to the left of the resistance curve obtained when the temperature is increasing so that the resistance does not drop substantially until the material is cooled to about 120° C., at which point the resistance decreases rapidly and reaches substantially a minimum when the temperature of the material is approximately 110° C. With repeated temperature cycling, the resistance of the material varies substantially as illustrated in FIG. 1.

When carbon black was mixed only with the same phenolic molding material and molded, the polyethylene and the step of first mixing carbon black with polyethylene being omitted, it was found that the temperature-resistance characteristic of the resulting molded material was substantially as illustrated by the graph in FIG. 2. Thus, taking the resistance of the material at 20° C. as being 100 percent, the resistance of the material increased in accordance with a straight line to approximately 130 percent of the value at 20° C. when the temperature reached 160° C. There was no sudden change in the resistance throughout the range of temperatures, and hence there was no large increase in resistance in the range from 100° to 130° C. Therefore, it is apparent that the electrical characteristics of the molded material prepared in accordance with the method of the invention differ greatly from the electrical characteristics of a molded material comprising only carbon black and the molding material.

The following examples illustrate specific preferred processes for producing the temperature sensitive material of the invention. The proportions set forth in the examples are proportions by weight.

EXAMPLE I

Sixty parts of low pressure polyethylene of the type sold under the trade name "Hizex" by Mitsui Petrochemical K.K. was well mixed with forty parts of furnace black of the type sold under the trade name "Seast" 305 by Tokai Denkyoku K.K. in a conventional two-roll mill at a temperature of 180° C. The resulting mixture was then cooled to substantially below 180° C. and was ground into a powder which would pass through an 80-mesh screen. Thirty parts of such powder was then mixed with seventy parts of a phenolic resin molding compound of the type sold under the trade name "Nationalite" N3610 by the Matsushita Electric Works Ltd. This second mixture was then molded for 3 minutes at 180° C. under a pressure of 150 kilograms per square centimeter.

The resulting molded piece looked very similar to a well-molded piece made from a phenolic resin alone and was so resistant to heat that it did not expand and deform even when heated in an oil bath to a temperature of 200° C. With respect to mechanical strength, the piece was only slightly inferior to pieces made of phenolic resin only, but as compared to pieces made solely of a carbon black-polyethylene mixture, the piece was far superior in both resistance to damage by heating and in mechanical strength.

At room temperature the piece produced as described above had a specific resistance of approximately 230 ohms per centimeter. When the temperature of the piece was varied from −10° C. to 120° C., the resistance varied only slightly, but when the temperature was increased over 120° C., the resistance increased suddenly and approached infinity when a temperature of 130° C. was reached. Increasing the temperature from 130° C. to 200° C. did not cause any further appreciable increase in the resistance of the piece, the resistance being almost infinite at all temperatures over 130° C. When the piece was cooled from 200° C. down to 120° C., the resistance remained substantially infinite, but as the temperature was decreased from 120° C. to 110° C., the resistance decreased abruptly and finally stabilized at its original value of 230 ohms per centimeter when the temperature was decreased to less than 110° C. Further repetition of the temperature cycling as described above produced substantially the same resistance versus temperature characteristic.

EXAMPLE II

Thirty-five parts of the carbon black-polyethylene powdered mixture produced as described in Example I was mixed in a ball mill with 65 parts of a melamine molding compound of the type sold under the trade name "Nationalite" M–0265 by the Matsushita Electric Works Ltd. The resulting mixture was then molded for 3 minutes at a pressure of 150 kilograms per square centimeter in a mold heated to 160° C. The resulting piece had substantially the same heat durability and mechanical strength as a piece molded from such melamine compound only. The electrical resistance at room temperature was approximately 180 ohms per centimeter, and when the piece was heated, the change in resistance was very small until a temperature of 120° C. was reached. Between 120° C. and 130° C. there was a sharp rise of the resistance, and it reached a value approaching infinity at a temperature slightly over 130° C. Upon cooling from 200° C., the resistance decreased abruptly from substantially an infinite value to near its original value in the range from 120° C. to 110° C. When the temperature became less than 110° C., the original resistance value of 180 ohms per centimeter was again obtained. Such characteristics of the piece remained substantially the same with a repetition of such temperature cycling one thousand times.

EXAMPLE III

Twenty-five parts of the carbon black-polyethylene powdered mixture produced in accordance with Example I was similarly mixed with 75 parts of an epoxy molding compound of the type sold under the trade name "Nationalite" *N*–1510 by the Matsushita Electric Works Ltd., and the resulting mixture was molded for 3 minutes at a temperature of 180° C. and with a pressure of 100 kilograms per square centimeter. The molded piece was as durable with respect to heat and as strong as pieces made from such epoxy resin alone. The resistance value at room temperature was approximately 280 ohms per centimeter, and there was little change in the resistance until the temperature reached approximately 120° C. However, as the temperature was increased above 120° C., the resistance increased substantially, reaching nearly a maximum at 130° C. and being substantially infinite at higher temperatures. As the piece was cooled from 200° C., the resistance remained substantially infinite until a temperature of 120° C. was reached, at which temperature the resistance dropped sharply, reaching substantially a minimum at 110° C. Below 110° C. the resistance returned to approximately 280 ohms per centimeter, and it was found that the reproducibility of the temperature versus resistance characteristics was very good.

EXAMPLE IV

Forty-five parts of furnace black of the type sold under the trade name "Seast" V by Tokai Denkyoku K.K. was mixed with 55 parts of high pressure polyethylene of the type sold under the trade name "Sumikathane" G101 by Sumitomo Kagaku K.K. in a conventional roll mill at 140° C. for 20 minutes. To 40 parts of such mixture in finely divided form were added 60 parts of polypropylene of the type sold by Sumitomo under the trade name "Sumitomo Noblene" H101. The combined materials were mixed with a roll for 8 minutes at a temperature of 260° C., the mixture being rolled into a sheet. The electrical resistance at room temperature was 120 ohms per centimeter. The heat durability and mechanical strength of the resulting sheet was found to be closer to those of polypropylene than to those of polyethylene. When a test piece of the sheet was heated, there was almost no change of resistance until a temperature of 110° C. was reached, at which the resistance remained extremely high, approaching infinity. As the piece was cooled, the resistance remained substantially infinite until the temperature was reduced to 110° C., at which temperature the resistance suddenly decreased, reaching nearly its minimum at 100° C. At slightly less than 100° C. the original resistance of 120 ohms per centimeter was reached, and the resistance remained at this value as the temperature was further lowered. Repetition of the same temperature cycling produced substantially the same results.

EXAMPLE V

One hundred parts of PVC (polyvinylchloride) of the type sold under the trade name "Geon" 130 EP by Nippon Geon K.K. was mixed for 10 minutes with a conventional roll mill at 160° C. with 10 parts of DOP (dioctylphthalate), 3 parts of tribasic sulfate and 1 part of stearic acid. Twenty-five parts of the finely divided carbon black-polyethylene mixture produced as set forth in Example IV was mixed with 75 parts of the PVC mixture just described for 5 minutes. The resulting mixture was molded to sheet form, and it was found that the resistance at room temperature was 260 ohms per centimeter. There was only a slight variation of the resistance as the temperature was increased from room temperature to 110° C., at which temperature the resistance increased suddenly, reaching nearly infinity at 120° C. At temperatures above 120° C., the value was close to infinite and remained at this value as the piece was cooled until a temperature of 110° C. was reached. At 110° C. the resistance suddenly decreased, the resistance reaching substantially 260 ohms per centimeter at temperatures below 100° C. Again, it was found that the temperature versus resistance characteristic was reproducible with repeated temperature cycling.

EXAMPLE VI

One hundred parts of natural rubber, 2 parts of stearic acid, 1 part of an accelerator DM (dibenzothiazole disulfide), 0.5 part of another accelerator M (mercaptobenzothiazole) and 25 parts of sulfur were mixed for 25 minutes in a conventional two-roll mill. Seventy parts of such mixture was mixed for 8 minutes with 30 parts of the carbon black-polyethylene mixture produced as described in Example IV and in powder form. The resulting mixture was vulcanized and formed into sheet under pressure at a temperature of 145° C. for 30 minutes. The resulting sheet had a flexibility and character similar to that of vulcanized rubber alone. The resistance value at room temperature was 210 ohms per centimeter which varied only slightly as the temperature was increased to approximately 110° C. The resistance increased rapidly as the temperature was increased from 110° C. to 120° C., the resistance being substantially infinite at temperatures slightly above 120° C. At higher temperatures and as the temperature was decreased to 110° C., the resistance remained substantially infinite, but in the range from 110° C. to 100° C. the resistance dropped suddenly to substantially its initial value. At temperatures below 100° C. the original value of 210 ohms per centimeter was reached, and it was found that the temperature versus resistance characteristics were reproducible with repeated temperature cycling.

Having described the present invention, that which is sought to be protected is set forth in the following claims.

That which is claimed is:

1. In the method of manufacturing a solid, electrical resistor which comprises an electrically conductive resistance element between spaced electrically conductive terminals in electrical contact therewith, said element having a non-linear, temperature-responsive, electrical resistance which is relatively low at temperatures below 100° C. and which increases several-fold at a temperature range above 100° C., said element retaining said temperature-responsive resistance properties with repeated cycling of the temperature to above and below said temperature range, the improvement in the method of manufacturing said element which comprises dispersing a finely divided electrically conductive material in a thermoplastic polymer resin in weight proportions respectively in the range from 25:100 to 150:100 to form a first mixture, said resin being selected from the group consisting of polyethylene, polypropylene, polyisobutylene, polytetrafluoroethylene, trifluoromonochloroethylene, copolymers thereof and admixtures thereof, dispersing said first mixture in finely divided form in a molding material selected from the group consisting of phenol resin, urea resin, melamine resin, unsaturated polyester resin, epoxy resin, polyethylene, polypropylene, polyvinylidene chloride, polystyrene, polymethylmethacrylate, polycarbonate, polyacetal, acrylonitrile-butadiene-styrene resin, acrylonitrile-styrene resin, natural rubber, butadiene-styrene rubber, butyl rubber, ethylene-propylene rubber, and mixtures thereof, to form a second mixture, the weight proportions of said first mixture to said molding material being respectively in the range from 95:10 to 10:90, consolidating said second mixture to thereby produce said element having said temperature responsive resistance.

2. A method as set forth in claim 1 wherein the step of consolidating said second mixture includes heating said second mixture to a temperature above the melting point of said first-mentioned resin.

3. A method as set forth in claim 1 wherein said first-mentioned range is 1:2 to 1:1 and said second-mentioned range is 1:4 to 1:1.

4. In the method of manufacturing a solid electrical resistor which comprises an electrically conductive resistance element between spaced electrically conductive terminals in electrical contact therewith, said element having a non-linear, temperature-responsive, electrical resistance which is relatively low at temperatures below 100° C. and which increases several-fold at a temperature range above 100° C., said element retaining said temperature-responsive resistance properties with repeated cycling of the temperature to above and below said temperature range, the improvement in the method of manufacturing said element which comprises mixing together a finely divided electrically conductive material and a thermoplastic polymer resin in weight proportions respectively in the range from 25:100 to 150:100 to form a first mixture, said resin being selected from the group consisting of polyethylene, polypropylene, polyisobutylene, polytetrafluoroethylene, trifluoromonochloroethylene, copolymers thereof and admixtures thereof, reducing said mixture to finely divided form, mixing said first mixture in said form with a molding material selected from the group consisting of phenol resin, urea resin, melamine resin, unsaturated polyester resin, epoxy resin, polyethylene, polypropylene, polyvinylidene chloride, polystyrene, polymethylmethacrylate, polycarbonate, polyacetal, acrylonitrile-butadiene-styrene resin, acrylonitrile-styrene resin, natural rubber, butadiene-styrene rubber, butyl rubber, ethylene-propylene rubber, and mixtures thereof to form a second mixture, the weight proportions of said first mixture to said molding material being respectively in the range from 95:10 to 10:90, and molding and consolidating said second mixture to thereby produce said element having said temperature-responsive resistance.

5. A method as set forth in claim 4 in which said conductive material is carbon and said thermoplastic polymer resin is polyethylene.

6. A method as set forth in claim 5 wherein said molding material is selected from the group consisting of phenol resin, melamine resin, epoxy resin, polypropylene, polyvinylchloride and natural rubber.

7. A method as set forth in claim 6 wherein said first-mentioned range is 1:2 to 1:1 and said second-mentioned range is 1:4 to 1:1.

8. A method as set forth in claim 6 wherein said second mixture is consolidated under heat and pressure at a temperature above the melting point of the polyethylene used in said first mixture.

9. An electrical resistor comprising an electrically conductive resistor element interposed between a pair of electrically conductive connecting terminals said element having a non-linear, temperature-responsive, electrical resistance which is relatively low at temperatures below 100° C. and which increases several-fold at a temperature range above 100° C., said resistor retaining said temperature-responsive resistance properties with repeated cycling of the temperature to above and below said temperature range, said element being produced by dispersing a finely divided electrically conductive material in a thermoplastic polymer resin in weight portions respectively in the range from 25:100 to 150:100 to form a first mixture, said resin being selected from the group consisting of polyethylene, polypropylene, polyisobutylene, polytetrafluoroethylene, trifluoromonochloroethylene, copolymers thereof and admixtures thereof, dispersing said first mixture in finely divided form in a molding material selected from the group consisting of phenol resin, urea resin, melamine resin, unsaturated polyester resin, epoxy resin, polyethylene, polypropylene, polyvinylidene chloride, polystyrene, polymethlmethacrylate, polycarbonate, polyacetal, acrylonitrile-butadiene-styrene resin, acrylonitrile-styrene resin, natural rubber, butadiene-styrene rubber, butyl rubber, ethylene-propylene rubber, and mixtures thereof, to form a second mixture, the weight proportions of said first mixture to said molding material being respectively in the range from 95:10 to 10:90, and consolidating said second mixture to thereby produce said resistor element.

References Cited

UNITED STATES PATENTS

| | | | |
|---|---|---|---|
| 3,243,753 | 3/1966 | Kohler | 260—41 |
| 3,271,354 | 9/1966 | Weissert et al. | 260—41 |
| 3,385,808 | 5/1968 | Bonin et al. | 260—41 |
| 3,413,249 | 11/1968 | Luftglass et al. | 260—41 |

DOUGLAS J. DRUMMOND, Primary Examiner

U.S. Cl. X.R.

260—41